United States Patent
Diego Solana

(10) Patent No.: US 11,948,353 B2
(45) Date of Patent: Apr. 2, 2024

(54) LOCALIZATION OF A VEHICLE IN A MULTI-LEVEL ROAD SYSTEM

(71) Applicant: Zenuity AB, Gothenburg (SE)

(72) Inventor: Lucia Diego Solana, Gothenburg (SE)

(73) Assignee: Zenuity AB, Gothenburg (SE)

(*) Notice: Subject to any disclaimer, the term of this patent is extended or adjusted under 35 U.S.C. 154(b) by 168 days.

(21) Appl. No.: 17/313,779

(22) Filed: May 6, 2021

(65) Prior Publication Data
US 2022/0004763 A1    Jan. 6, 2022

(30) Foreign Application Priority Data
Jul. 1, 2020    (EP) .................................... 20183385

(51) Int. Cl.
| | |
|---|---|
| *H04W 4/029* | (2018.01) |
| *G06F 18/214* | (2023.01) |
| *G06F 18/24* | (2023.01) |
| *G06N 3/08* | (2023.01) |
| *G06V 20/10* | (2022.01) |
| *G06V 20/56* | (2022.01) |

(52) U.S. Cl.
CPC .......... *G06V 20/182* (2022.01); *G06F 18/214* (2023.01); *G06F 18/24* (2023.01); *G06N 3/08* (2013.01); *G06V 20/56* (2022.01); *H04W 4/029* (2018.02)

(58) Field of Classification Search
CPC ..... G06V 20/182; G06V 20/56; H04W 4/029; G06K 9/6256; G06K 9/6267; G06N 3/08
See application file for complete search history.

(56) References Cited

U.S. PATENT DOCUMENTS

| | | | |
|---|---|---|---|
| 2006/0217879 A1* | 9/2006 | Ikeuchi .................. | G01C 21/32 701/409 |
| 2019/0163993 A1* | 5/2019 | Koo ..................... | G06V 20/588 |
| 2020/0250440 A1* | 8/2020 | Campos ................ | G06V 10/82 |
| 2020/0271473 A1* | 8/2020 | Wang .................... | G08G 1/137 |

FOREIGN PATENT DOCUMENTS

| | | |
|---|---|---|
| EP | 2574958 A1 | 4/2013 |
| WO | 2019/071212 A1 | 4/2019 |

OTHER PUBLICATIONS

European Search Report dated Dec. 16, 2020 for International Application No. 20183385.2 filed on Jul. 1, 2020, consisting of 9-pages.

* cited by examiner

*Primary Examiner* — Umair Ahsan
(74) *Attorney, Agent, or Firm* — Christopher & Weisberg, P.A.

(57) ABSTRACT

A method performed by a road identifying system of a vehicle for localization of the vehicle in a multi-level road system. The road identifying system determines with support from a positioning system, a position of the vehicle, identifies, based on the vehicle position with support from at least a first digital map, a multi-level road system in which the vehicle is positioned and obtains image data with support from one or more image capturing devices adapted to capture surroundings of the vehicle. Moreover, the road identifying system determines a road level at which the vehicle is positioned based on feeding the image data through a neural network trained to classify road level based on context of image content and identifies based on the determined road level, with support from the at least first digital map, a road and/or lane of the multi-level road system at which the vehicle is positioned.

17 Claims, 3 Drawing Sheets

LOCALIZATION OF A VEHICLE IN A MULTI-LEVEL ROAD SYSTEM

TECHNICAL FIELD

The present disclosure relates to localization of a vehicle in a multi-level road system.

BACKGROUND

Large cities—e.g. megalopolises such as Shanghai, Hong Kong, Tokyo or Mexico City—commonly have highway-type roads passing through and/or circling their cities, to liberate traffic from small and narrow local roads. In their non-stopping growth, such cities may build several levels of roads—i.e. multi-level road system—having different exit and merging lanes, with roads potentially going in the same road direction.

Multi-level road systems may, however, pose a problem when it comes to localizing at which road level of a multi-level road system a vehicle is positioned. That is, automotive localization technology is commonly based on commercial—often relatively low-grade—positioning systems, for instance GNSS such as GPS. Although a geographical location—such as a horizontal position—of the vehicle may be derived therefrom, it may—e.g. in the absence of e.g. an altimeter and/or barometric pressure sensor—be challenging to derive the vehicle's vertical position.

SUMMARY OF THE INVENTION

It is therefore an object of embodiments herein to provide an approach for in an improved and/or alternative manner identify a road and/or lane of a multi-road system, at which a vehicle is positioned.

The object above may be achieved by the subject-matter disclosed herein. Embodiments are set forth in the appended claims, in the following description and in the drawings.

The disclosed subject-matter relates to a method performed by a road identifying system of a vehicle for localization of the vehicle in a multi-level road system. The road identifying system determines with support from a positioning system a position of the vehicle. The road identifying system further identifies based on the vehicle position—with support from at least a first digital map—a multi-level road system in which the vehicle is positioned. Moreover, the road identifying system obtains image data with support from one or more image capturing devices adapted to capture surroundings of the vehicle. The road identifying system further determines a road level at which the vehicle is positioned based on feeding the image data through a neural network trained to classify road level based on context of image content. Furthermore, the road identifying system identifies based on the determined road level—with support from the at least first digital map—a road and/or lane of the multi-level road system at which the vehicle is positioned.

The disclosed subject-matter further relates to a road identifying system of a vehicle for localization of the vehicle in a multi-level road system. The road identifying system comprises a position determining unit for—and/or adapted for—determining with support from a positioning system, a position of the vehicle. The road identifying system further comprises a multi-level system identifying unit for—and/or adapted for—identifying based on the vehicle position, with support from at least a first digital map, a multi-level road system in which the vehicle is positioned. Moreover, the road identifying system comprises an image data obtaining unit for—and/or adapted for—obtaining image data with support from one or more image capturing devices adapted to capture surroundings of the vehicle. Furthermore, the road identifying system comprises a level determining unit for—and/or adapted for—determining a road level at which the vehicle is positioned based on feeding the image data through a neural network trained to classify road level based on context of image content. Moreover, the road identifying system comprises a road/lane identifying unit for—and/or adapted for—identifying based on the determined road level, with support from the at least first digital map, a road and/or lane of the multi-level road system at which the vehicle is positioned.

Furthermore, the disclosed subject-matter relates to a vehicle comprising a road identifying system as described herein.

Moreover, the disclosed subject-matter relates to a computer program product comprising a computer program containing computer program code means arranged to cause a computer or a processor to execute the steps of a the road identifying system described herein, stored on a computer-readable medium or a carrier wave.

The disclosed subject-matter further relates to a non-volatile computer readable storage medium having stored thereon said computer program product.

Thereby, there is introduced an approach according to which a correct road and/or lane of a multi-level road system, at which a vehicle is positioned, may be identified. That is, since—with support from a positioning system—a position of the vehicle is determined, there is established geographical whereabouts of the vehicle, such as its horizontal position. Further, that is, since there is identified based on the vehicle position—with support from at least a first digital map—a multi-level road system in which the vehicle is positioned, by mapping the vehicle position to one or more digital maps, a multi-level road system may be identified therein, in which—or in vicinity of which—multi-level road system the vehicle in view of the digital map(s) is deemed to be located. Moreover, that is, since there is obtained image data with support from one or more image capturing devices adapted to capture surroundings of the vehicle, there is derived data from one or more captured images showing vehicle surroundings. Furthermore, that is, since there is determined a road level at which the vehicle is positioned based on feeding the image data through a neural network trained to classify road level based on context of image content, by utilizing a pre-trained neural network adapted to identify and subsequently classify a road level based on cues, hints and/or indications of a scene, setting and/or circumstances of the vehicle's surroundings from obtained image data, a current road level may be established. That is, the image data is run through a neural network trained to classify—based on visual and contextual cues—what road level an image may indicate. For instance, the neural network may be trained to identify and/or classify an image showing the sky without any structure(s) and/or road structure(s) above, as indicating a highest road level and/or a road without road levels above, whereas an image showing road structure(s) in upper portions of said image in combination with vulnerable road user(s) in the same horizontal plane as the vehicle, may be identified and/or classified by the neural network as ground road level and/or bottom road level. Moreover, that is, since there is identified based on the determined road level, with support from the at least first digital map, a road and/or lane of the multi-level road system at which the vehicle is positioned, by having established a potential, feasible and/or likely road level relevant for the current vehicle position by running the image data through the neural network, and by confronting the digital map, the corresponding road level of the multi-level road system may be identified, and subsequently, the corresponding road and/or lane of that road level relevant for the current vehicle position, derived. Accordingly, with the introduced concept, the correct road level out of plural road levels of the multi-level road system may be found, and subsequently, the correct road and/or lane along which the vehicle is positioned, determined.

For that reason, an approach is provided for in an improved and/or alternative manner identify a road and/or lane of a multi-road system, at which a vehicle is positioned.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
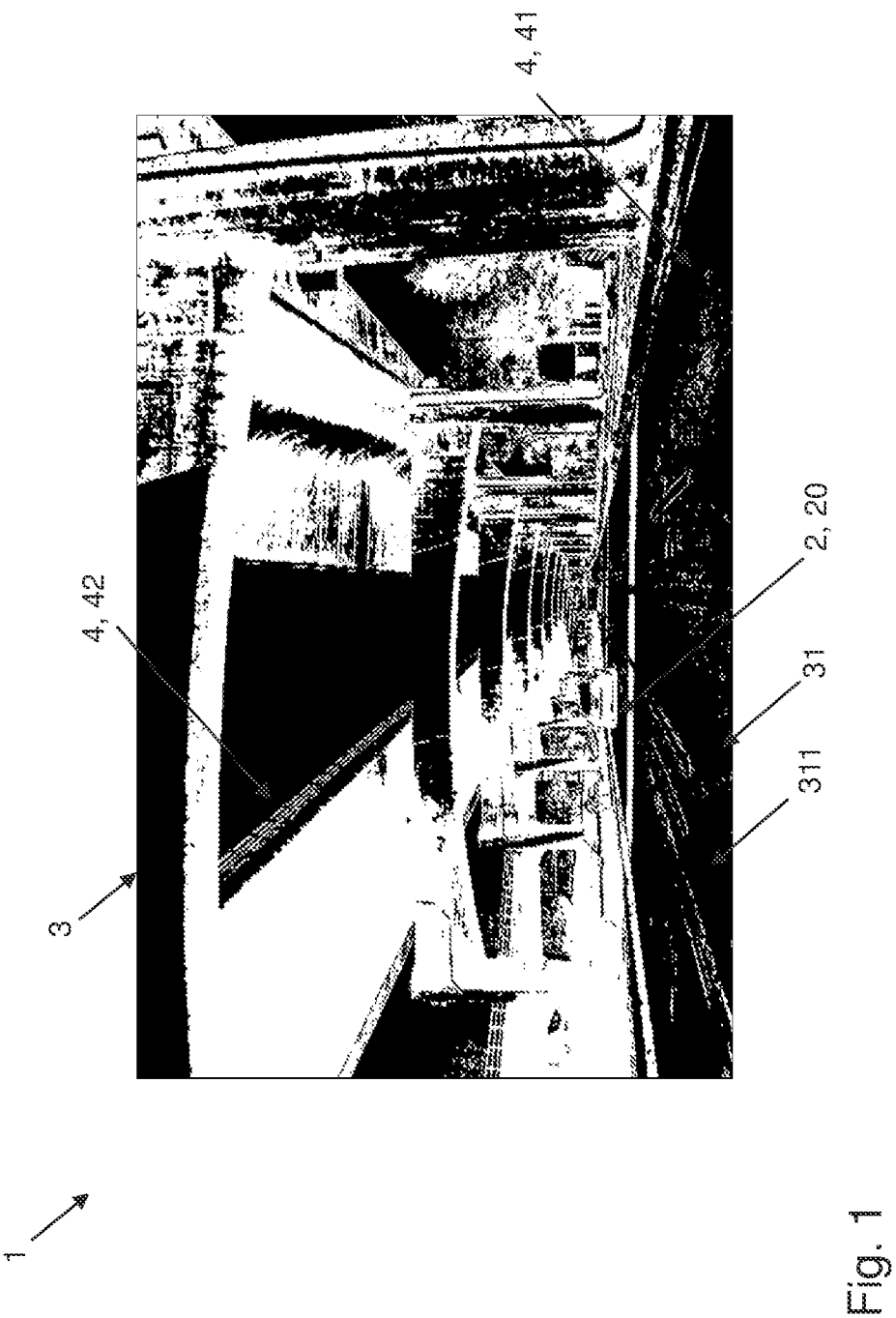
FIG. 1 illustrates a schematic view of an exemplifying road identifying system of a vehicle according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to localization of a vehicle in a multi-level road system, there will be disclosed an approach according to which the correct road and/or lane of the multi-level road system, at which the vehicle is positioned, may be identified.

Figure 2:
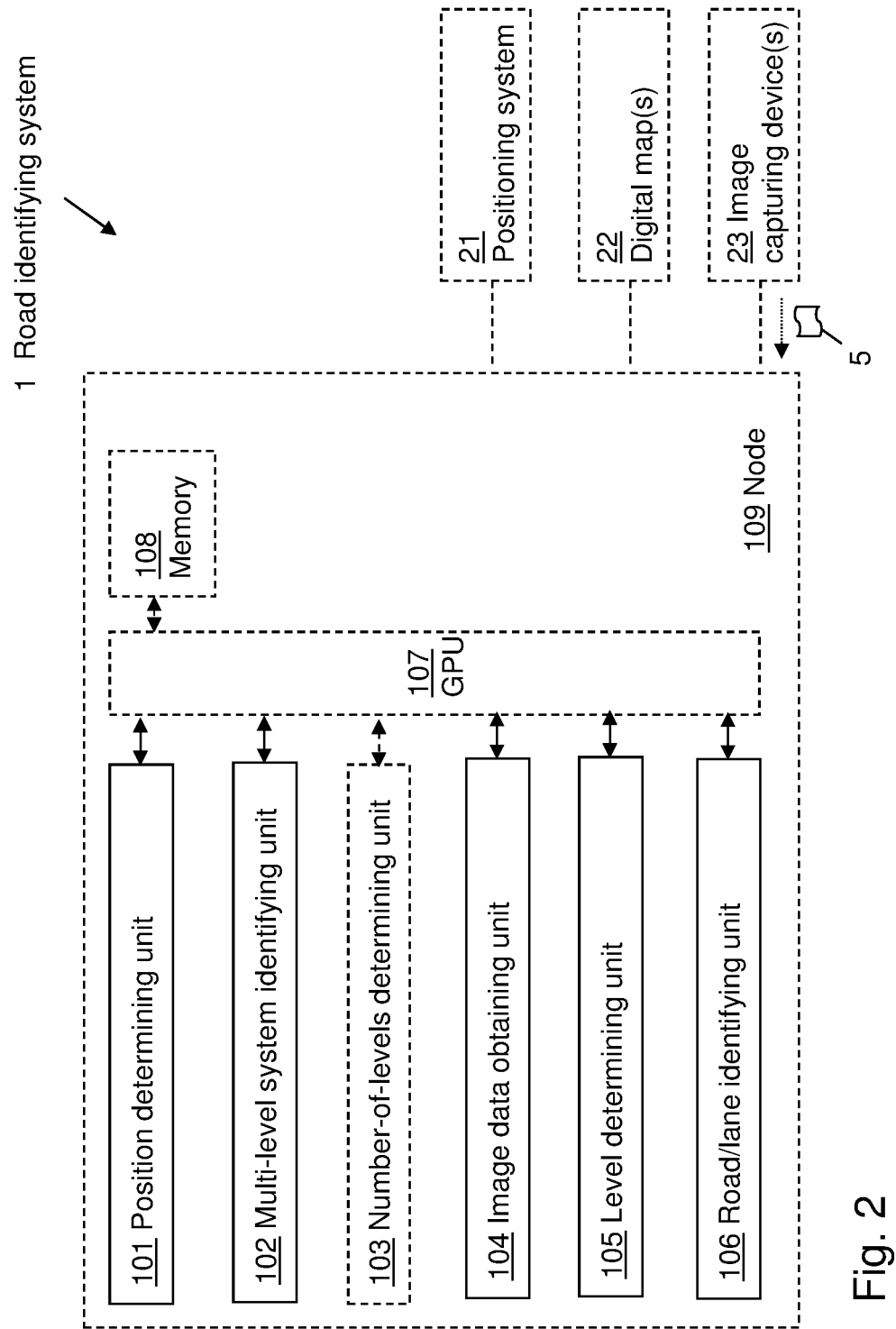
FIG. 2 is a schematic block diagram illustrating an exemplifying road identifying system according to embodiments of the disclosure.

Referring now to the figures, there is depicted in FIG. 1 a schematic view of an exemplifying road identifying system 1 of a vehicle 2 according to embodiments of the disclosure, and in FIG. 2 a schematic block diagram illustrating an exemplifying road identifying system 1 according to embodiments of the disclosure. The road identifying system 1 is adapted for localization of the vehicle 2 in a multi-level road system 3.

The exemplifying vehicle 2 may be represented by any arbitrary—e.g. known—manned or unmanned vehicle, for instance an engine-propelled or electrically-powered vehicle such as a car, truck, lorry, van, bus, tractor and/or motorcycle or the like. Moreover, according to an example, the vehicle 2 may optionally refer to "autonomous and/or at least partly autonomous vehicle", "driverless and/or at least partly driverless vehicle", and/or "self-driving and/or at least partly self-driving vehicle".

The multi-level road system 3 may be represented by any arbitrary road configuration of any arbitrary dimensions, with plural road levels 4, e.g. with two or more road levels 4 at least to some extent running in the same—or essentially the same—road direction. In exemplifying FIG. 1, two road levels 4 are depicted in an exemplifying manner; a first ground road level 41 and a second upper road level 42. It may be noted that, although not illustrated here, a multi-level road system 3 optionally may comprise one or more under-ground road levels 4.

The phrase "road identifying system" may refer to "road assigning system", "road and/or lane identifying system" and/or "road level assessment system", whereas "of" a vehicle may refer to "comprised in" a vehicle and/or "on-board" a vehicle. "For" localization of the vehicle, on the other hand, may refer to "adapted for" localization of the vehicle, whereas "for localization of said vehicle" may refer to "for positioning of said vehicle", "for road and/or lane assignment of said vehicle", "for road level assessment" and/or "for assessment of a road level of said vehicle". Moreover, the phrase "multi-level road system" may throughout refer to "plural-level road system", "road system comprising at least two road levels" and/or "multi-level road configuration and/or network".

The road identifying system 1 is—e.g. by means of a position determining unit 101—adapted and/or configured for determining, with support from a positioning system 21, a position 20 of the vehicle 2. Thereby, there is established geographical whereabouts 20 of the vehicle 2, such as its horizontal position 20.

Determining the position 20 of the vehicle 2 with support from a positioning system 21 may be accomplished in any arbitrary—e.g. known—manner, potentially with additional support from dead reckoning computations and/or similar approaches. Similarly, the positioning system 21 may be represented by any arbitrary—e.g. known—sensors and/or functionality adapted to sense and/or determine whereabouts and/or geographical position—for instance of a vehicle—e.g. via GNSS such as GPS. The positioning system 21 may accordingly be at least partly comprised in—and/or provided on-board—the vehicle 2, for instance in association with a—e.g. known—optional navigation system, and/or a—e.g. known—optional perception system, optional advanced driver-assistance system, ADAS, and/or optional autonomous driving, AD, system of the vehicle 2.

The phrase "determining [ . . . ] a position" may refer to "deriving [ . . . ] a position, whereas "position" may refer to "geographical position" and/or "horizontal position". The phrase "with support from a positioning system", on the other hand, may refer to "with input from a positioning system", "from a positioning system", "with support at least from a positioning system" and/or "with support from a positioning system comprised in and/or on-board said vehicle", whereas "a position of said vehicle" may refer to "a vehicle position".

The road identifying system 1 is—e.g. by means of a multi-level system identifying unit 102—adapted and/or configured for identifying based on the vehicle position 20, with support from at least a first digital map 22, a multi-level road system 3 in which the vehicle 2 is positioned. Thereby, by mapping the vehicle position 20 to one or more digital maps 22, a multi-level road system 3 such as the one exemplified in FIG. 1 may be identified therein, in which— or in vicinity of which—multi-level road system 3 the vehicle 2 in view of the digital map(s) 22 is deemed to be located.

Identifying—based on the vehicle position 20—a multi-level road system 3 in which the vehicle 2 is positioned, may be accomplished in any arbitrary—e.g. known—manner in view of the digital map(s) 22. For instance, the multi-level road system 3 may be tagged and/or marked as such in the digital map(s) 22, and/or it may be derived from that plural digital maps 22 are provided for a specific geographical area and/or stretch of road—such as a respective digital map covering a respective road level—should a multi-level road configuration 3 apply for said specific geographical area and/or stretch of road. The at least first digital map 22 may be represented by any arbitrary—e.g. known—digital map, such as a high definition, HD, map and/or an equivalent and/or successor thereof. Moreover, the digital map(s) 22 may be at least partly comprised in—and/or provided on-board—the vehicle 2, for instance in association with a—e.g. known—navigation system, and/or a—e.g. known—optional perception system, optional ADAS and/or optional AD system of the vehicle 2.

The phrase "identifying [ . . . ] a multi-level road system" may refer to "deriving [ . . . ] a multi-level road system" and/or "determining [ . . . ] a multi-level road system", whereas "identifying based on said vehicle position with support from at least a first digital map" may refer to "identifying by mapping said vehicle position to at least a first digital map", "identifying based on said vehicle position in view of at least a first digital map" and/or "based on comparing said vehicle position to at least a first digital map". Moreover, the phrase "at least a first digital map" may refer to "one or more digital maps", and according to an example further to merely "a digital map". The phrase "multi-level road system in which said vehicle is positioned" may refer to "multi-level road system in which said vehicle is determined and/or deemed to be positioned" and/or "multi-level road system in which said vehicle is positioned or from which said vehicle position is within a predeterminable distance".

The road identifying system 1 is—e.g. by means of an image data obtaining unit 104—adapted and/or configured for obtaining image data 5 with support from one or more image capturing devices 23 adapted to capture surroundings of the vehicle 2. Thereby, there is derived data 5 from one or more images of vehicle surroundings captured by said image capturing device(s) 23.

The image data 5 may be obtained in any arbitrary—e.g. known—manner with support from the at least a first image capturing device 23, for instance derived from one or more images captured by said image capturing device(s) 23, for instance continuously and/or intermittently. Similarly, the one or more image capturing devices 23—which may be comprised in and/or be provided on-board the vehicle 2 and distributed in any arbitrary feasible manner—may be represented by any arbitrary sensors, functionality and/or systems adapted to capture surrounding of the vehicle 2, for instance one or more cameras. According to an example, the image capturing device(s) 23 may be provided in association with a—e.g. known—optional perception system, optional ADAS and/or optional AD system of the vehicle 2. Moreover, the image data 5 may be represented by any arbitrary feasible data derived from the image capturing device(s) 23, and further be of any arbitrary feasible size and/or format. Furthermore, the image data 5 may cover any arbitrary portion of vehicle surroundings, in any arbitrary direction of the vehicle 2, for instance in at a least a forward direction of said vehicle 2.

The phrase "obtaining image data" may refer to "deriving and/or capturing image data", whereas "image data" may refer to "image data of at least a portion of surroundings of said vehicle" and/or "one or more images". Moreover, according to an example, "obtaining image data with support from" may refer to "obtaining image data from one or more images derived with support from". The phrase "adapted to capture surroundings of said vehicle", on the other hand, may refer to "adapted to capture at least a portion of surroundings of said vehicle".

The road identifying system 1 is—e.g. by means of a level determining unit 105—adapted and/or configured for determining a road level at which the vehicle 2 is positioned, based on feeding the image data 5 through a neural network trained to classify road level based on context of image content. Thereby, by utilizing a pre-trained neural network adapted to identify and subsequently classify a road level based on cues, hints and/or indications of a scene, setting and/or circumstances of the vehicle's 2 surroundings from obtained image data 5, a current road level may be established. That is, the image data 5 is run through a neural network trained to classify—based on visual and contextual cues—what road level an image may indicate. For instance, the neural network may be trained to identify and/or classify an image showing the sky without any structure(s) and/or road structure(s) above, as indicating a highest road level and/or a road without road levels above, whereas an image showing road structure(s) in upper portions of said image in combination with vulnerable road user(s) in the same horizontal plane as the vehicle, may be identified and/or classified by the neural network as ground road level and/or bottom road level. In exemplifying FIG. 1, the image data 5 comprises and/or reveals in an exemplifying manner context indicating road structures—here comprising the upper road level 42—above the vehicle 2 in combination with bases of buildings, pillars and trees in a same horizontal plane as the vehicle 2, whereby the neural network based on that specific context may classify a road level associated therewith to be a ground road level.

Optionally, the context of image content may refer to—and/or comprise—characteristics of one or more road configurations, such as road ramps. Additionally or alternatively, the context of image content may refer to characteristics of one or more static objects, such as buildings and/or pillars—e.g. bases and/or tops thereof—and/or landscape and/or topography. Moreover, additionally or alternatively, the context of image content may refer to characteristics of one or more other road users, such as presence or non-presence thereof e.g. of vulnerable road users. Furthermore, additionally or alternatively, the context of image data may refer to extent of obstructed—and/or unobstructed—sky view and/or side view, such as by one or more overhead structures and/or underground walls. Moreover, additionally or alternatively, the context of image data may refer to extent of ambient light, such as daylight, direct sunlight and/or direct moonlight.

Further optionally, determining a road level at which the vehicle 2 is determined to be positioned may comprise feeding the image data 5 through a neural network trained to classify road level based on context of image content and additionally based on geographical location. Thereby, consideration is taken to that context of image content may vary and/or have different meaning depending on geographical location such as country, state and/or region, which thus may affect classification of road level.

The neural network may be represented by any arbitrary—e.g. known—feasible neural network, such as an artificial neural network, ANN. Optionally, the neural network may comprise and/or be represented by a deep neural network, DNN, for instance a convolutional neural network, CNN. Moreover, according to an example, the neural network may comprise and/or be represented by a CNN of type Scene Classifier known in the art, and/or an equivalent and/or successor thereof. The neural network may be trained—and/or have been trained—based on a dataset, such as a labelled dataset. For instance, input data to said dataset may be collected—and/or have been collected—by one or more image-capturing vehicles e.g. in target cities where multi-level road systems are common, with one or more images captured by the image-capturing vehicle(s) subsequently labelled, e.g. manually, based on—for at least a first known vehicle position—the known corresponding road level, derived from knowledge of road levels and/or number of road levels at said vehicle position e.g. derivable from a digital map such as of a type corresponding and/or similar to the at least first digital map 22 described above.

The phrase "determining a road level" may refer to "identifying and/or classifying a road level", whereas "at which said vehicle is positioned" may refer to "at which said vehicle is deemed to be positioned", "at which said vehicle is located" and/or "at which said vehicle within a predeterminable distance and/or time is deemed to be positioned". Moreover, the phrase "based on feeding said image data through a neural network" may refer to "based on feeding said image data to a neural network", "based on running said image data through a neural network", "by feeding said image data through a neural network", "based at least on feeding said image data through a neural network" and/or "based on applying to said image data a neural network". Moreover, "neural network" may refer to "artificial neural network" and/or "at least a first neural network". The phrase "trained to classify", on the other hand, may refer to "trained to identify and/or classify" and/or "pre-trained to classify", whereas "based on context of image content" may refer to "based on a scene, setting and/or circumstances in image content", "based on cues, hints and/or indications in image content" and/or "based on cues, hints and/or indications of a scene, setting and/or circumstances in image content".

Optionally, the road identifying system 1 may—e.g. by means of an optional number-of-levels determining unit 103—be adapted and/or configured for identifying with support from the at least first digital map 22, number of road levels 4 of the multi-level road system 3, whereby determining a road level based on feeding the image data 5 through a neural network trained to classify road level based on context of image content then additionally may be based on the number of road levels 4. Thereby, the road level resulting from running the image data 5 through the neural network may be narrowed down to, matched and/or compared with the number of road levels 4 of the multi-level road system 3, and accordingly, said resulting road level potentially adjusted in accordance therewith. Thus, should a road level resulting from the neural network processing potentially be non-existing in the multi-level road system 3—for instance an exemplifying non-existing underground road level and/or a road level higher than provided by the multi-level road system 3—then, to determine the road level, the road level resulting from the neural network processing may be adjusted taking into consideration available number of road levels 4 of the multi-level road system 3.

The road identifying system 1 is—e.g. by means of a road/lane identifying unit 106—adapted and/or configured for identifying based on the determined road level, with support from the at least first digital map 22, a road 31 and/or lane 311 of the multi-level road system 3 at which the vehicle 2 is positioned. Thereby, by having established a potential, feasible and/or likely road level relevant for the current vehicle position 20 by running the image data 5 through the neural network, and by confronting the digital map 22, the corresponding road level of the multi-level road system 3—in exemplifying FIG. 1 represented by the ground road level 41—may be identified, and subsequently, the corresponding road 31 and/or lane 311 of that road level 41 relevant for the current vehicle position 20, derived. Accordingly, with the introduced concept, the correct road level out of plural road levels 4 of the multi-level road system 3 may be found, and subsequently, the correct road 31 and/or lane 311 along which the vehicle 2 is positioned, determined.

The phrase "identifying based on said determined road level" may refer to "determining and/or deriving based on said determined road level", and further to "identifying by using, selecting and/or considering said determined road level". Moreover, the phrase "identifying based on said determined road level with support form said at least first digital map" may refer to "identifying based on said determined road level in view of said at least first digital map" and/or "identifying by selecting a road level of the multi-level road system indicated by the determined road level". The phrase "lane of said multi-level road system", on the other hand, may refer to "lane of a road of said multi-level road system", whereas "at which said vehicle is positioned" may refer to "along which said vehicle is positioned", "at which said vehicle is located" and/or "at which said vehicle is deemed to be positioned".

Optionally, the obtained image data 5 may be adapted to be used as training data for the neural network. Thereby, image data 5 e.g. tagged with the vehicle position 20, the multi-level road system 3, the optional number of levels of the multi-level road system 3, the determined road level, and/or the identified road 31 and/or lane 311 of the multi-level road system 3 at which the vehicle 2 is positioned, may be used for training the neural network.

As further shown in FIG. 2, the road identifying system 1 comprises a position determining unit 101, a multi-level system identifying unit 102, an optional number-of-levels determining unit 103, an image data obtaining unit 104, a level determining unit 105, and a road/lane identifying unit 106, all of which already have been described in greater detail above. Furthermore, the embodiments herein for localization of a vehicle 2 in a multi-level road system 3, may be implemented through one or more processors, such as a processor 107, here denoted GPU as an abbreviation for Graphics Processing Unit, together with computer program code for performing the functions and actions of the embodiments herein. Said program code may also be provided as a computer program product, for instance in the form of a data carrier carrying computer program code for performing the embodiments herein when being loaded into the road identifying system 1. One such carrier may be in the form of a CD ROM disc and/or a hard drive, it is however feasible with other data carriers. The computer program code may furthermore be provided as pure program code on a server and downloaded to the road identifying system 1. The road identifying system 1 may further comprise a memory 108 comprising one or more memory units. The memory 108 may be arranged to be used to store e.g. information, and further to store data, configurations, scheduling, and applications, to perform the methods herein when being executed in the road identifying system 1. For instance, the computer program code may be implemented in the firmware, stored in FLASH memory 108, of an embedded processor 107, and/or downloaded wirelessly e.g. from an off-board server. Furthermore, the position determining unit 101, the multi-level system identifying unit 102, the optional number-of-levels determining unit 103, the image data obtaining unit 104, the level determining unit 105, the road/lane identifying unit 106, the optional processor 107 and/or the optional memory 108, may at least partly be comprised in one or more nodes 109 e.g. ECUs of the vehicle 2. Those skilled in the art will also appreciate that said units 101, 102, 103, 104, 105, 106 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 108, that when executed by the one or more processors such as the processor 107 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, Soc.

Further shown in FIG. 2 is the positioning system 21, the digital map(s) 22, the image capturing device(s) 23 and the image data 5, all of which have been discussed in greater detail above.

Figure 3:
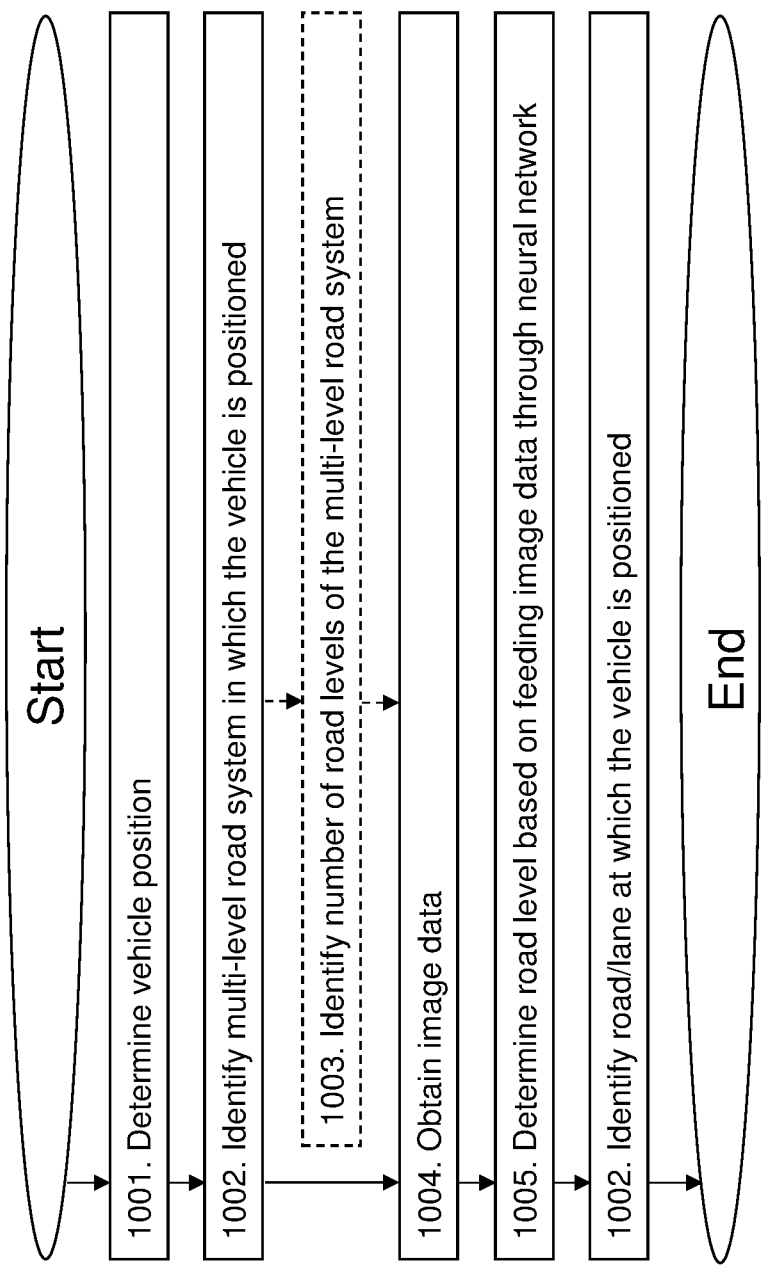
FIG. 3 is a flowchart depicting an exemplifying method performed by a road identifying system according to embodiments of the disclosure.

FIG. 3 is a flowchart depicting an exemplifying method performed by a road identifying system 1 according to embodiments of the disclosure. Said method is for localization of a vehicle 2 in a multi-level road system 3. The exemplifying method, which may be continuously repeated, comprises one or more of the following actions discussed with support from FIGS. 1-2. Moreover, the actions may be taken in any suitable order and/or one or more actions may be performed simultaneously and/or in alternate order where applicable. For instance, Action 1004 and/or Action 1005 may be performed simultaneously and/or prior to Action 1001, Action 1002 and/or Action 1003.

Action 1001

In Action 1001, the road identifying system 1 determines—e.g. with support from the position determining unit 101—with support from a positioning system 21, a position 20 of the vehicle 2.

Action 1002

In Action 1002, the road identifying system 1 identifies—e.g. with support from the multi-level system identifying unit 102—based on the vehicle position 20, with support from at least a first digital map 22, a multi-level road system 3 in which the vehicle 2 is positioned.

Action 1003

In optional Action 1003, the road identifying system 1 may identify—e.g. with support from the optional number-of-levels determining unit 103—with support from the at least first digital map 22, number of road levels 4 of the multi-level road system 3.

Action 1004

In Action 1004, the road identifying system 1 obtains—e.g. with support from the image data obtaining unit 104—image data 5 with support from one or more image capturing devices 23 adapted to capture surroundings of the vehicle 2.

Action 1005

In Action 1005, the road identifying system 1 determines—e.g. with support from the level determining unit 105—a road level at which the vehicle 2 is positioned based on feeding the image data 5 through a neural network trained to classify road level based on context of image content.

Optionally, the neural network may comprise a deep neural network, DNN.

Further optionally, the context of image content may relate to characteristics of one or more road configurations, characteristics of one or more static objects, characteristics of one or more other road users, extent of obstructed sky view and/or side view, and/or extent of ambient light.

Moreover, optionally, Action 1005 of determining a road level at which the vehicle 2 is positioned may comprise—and/or the level determining unit 105 may be adapted for—feeding the image data 5 through a neural network trained to classify road level based on context of image content and additionally based on geographical location.

Further optionally, should Action 1005 be preceded by optional action 1003, then Action 1005 of determining a road level may comprise—and/or the level determining unit 105 may be adapted for—determining a road level additionally based on the number of road levels 4.

Moreover, optionally, the obtained image data 5 may be adapted to be used as training data for the neural network.

Action 1006

In Action 1006, the road identifying system 1 identifies—e.g. with support from the road/lane identifying unit 106—based on the determined road level, with support from the at least first digital map 22, a road 31 and/or lane 331 of the multi-level road system 3 at which the vehicle 2 is positioned.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a road identifying system of a vehicle for localization of the vehicle in a multi-level road system, the method comprising:
   determining with support from a positioning system, a position of the vehicle;
   identifying based on the vehicle position with support from at least a first digital map, a multi-level road system in which the vehicle is positioned;
   identifying with support from the at least first digital map, a number of road levels of the multi-level road system;
   obtaining image data with support from one or more image capturing devices adapted to capture surroundings of the vehicle;
   determining a road level at which the vehicle is positioned based on the number of road levels and based on feeding the image data through a neural network trained to classify road level based on context of image content;
   identifying based on the determined road level with support from the at least first digital map, at least one of a road and a lane of the multi-level road system at which the vehicle is positioned; and localizing the vehicle in the multi-level road system based on the road and lane of the multi-level road system at which the vehicle is positioned.

2. The method according to claim 1, wherein the context relates to one or more of:
characteristics of one or more road configurations;
characteristics of one or more static objects;
characteristics of one or more other road users;
extent of at least one of obstructed sky view and side view; and
extent of ambient light.

3. The method according to claim 1, wherein the context relates to one or more of:
characteristics of one or more road configurations;
characteristics of one or more static objects;
characteristics of one or more other road users;
extent of at least one of obstructed sky view and side view; and
extent of ambient light.

4. The method according to claim 1, wherein the determining a road level at which the vehicle is determined to be positioned comprises feeding the image data through a neural network trained to classify road level based on context of image content and additionally based on geographical location.

5. The method according to claim 1, wherein the neural network comprises a deep neural network, DNN.

6. The method according to claim 1, wherein the obtained image data is adapted to be used as training data for the neural network.

7. A road identifying system of a vehicle for localization of the vehicle in a multi-level road system, the road identifying system comprising:
at least one processor configured to:
determining determine with support from a positioning system, a position of the vehicle;
identify based on the vehicle position with support from at least a first digital map, a multi-level road system in which the vehicle is positioned;
identify with support from the at least first digital map, a number of road levels of the multi-level road system;
obtain image data with support from one or more image capturing devices adapted to capture surroundings of the vehicle;
determine a road level at which the vehicle is positioned based on the number of road levels and based on feeding the image data through a neural network trained to classify road level based on context of image content; and
identify based on the determined road level with support from the at least first digital map, at least one of a road and a lane of the multi-level road system at which the vehicle is positioned; and
localize the vehicle in the multi-level road system based on the road and lane of the multi-level road system at which the vehicle is positioned.

8. The road identifying system according to claim 1, wherein the context relates to one or more of:
characteristics of one or more road configurations;
characteristics of one or more static objects;
characteristics of one or more other road users;
extent of one of more of obstructed sky view and side view; and
extent of ambient light.

9. The road identifying system according to claim 7, wherein the at least one processor is configured to feed the image data through a neural network trained to classify road level based on context of image content and additionally based on geographical location.

10. The road identifying system according to claim 7, wherein the neural network comprises a deep neural network, DNN.

11. The road identifying system according to claim 7, wherein the obtained image data is adapted to be used as training data for the neural network.

12. The road identifying system according to claim 7, wherein the road identifying system is comprised in a vehicle.

13. A non-transitory computer storage medium storing a computer program configured to cause a one of a computer and a processor to perform a method by a road identifying system of a vehicle for localization of the vehicle in a multi-level road system, the method comprising:
determining with support from a positioning system, a position of the vehicle;
identifying based on the vehicle position with support from at least a first digital map, a multi-level road system in which the vehicle is positioned;
identifying with support from the at least first digital map, a number of road levels of the multi-level road system;
obtaining image data with support from one or more image capturing devices adapted to capture surroundings of the vehicle;
determining a road level at which the vehicle is positioned based on the number of road levels and based on feeding the image data through a neural network trained to classify road level based on context of image content;
identifying based on the determined road level with support from the at least first digital map, at least one of a road and a lane of the multi-level road system at which the vehicle is positioned; and
localizing the vehicle in the multi-level road system based on the road and lane of the multi-level road system at which the vehicle is positioned.

14. The computer storage medium of claim 13, wherein the context relates to one or more of:
characteristics of one or more road configurations;
characteristics of one or more static objects;
characteristics of one or more other road users;
extent of at least one of obstructed sky view and side view; and
extent of ambient light.

15. The computer storage medium of claim 13, wherein the determining a road level at which the vehicle is determined to be positioned comprises feeding the image data through a neural network trained to classify road level based on context of image content and additionally based on geographical location.

16. The computer storage medium of claim 13, wherein the neural network comprises a deep neural network, DNN.

17. The computer storage medium of claim 13, wherein the obtained image data is adapted to be used as training data for the neural network.

* * * * *